United States Patent [19]

Mauron

[11] 4,213,637
[45] Jul. 22, 1980

[54] PASSIVE SAFETY BELT FOR AN AUTOMOBILE VEHICLE

[75] Inventor: Gerard Mauron, Versailles, France

[73] Assignees: Automobiles Peugeot; Societe Anonyme Automobiles Citroen, both of Paris, France

[21] Appl. No.: 966,569

[22] Filed: Dec. 5, 1978

[30] Foreign Application Priority Data

Dec. 15, 1977 [FR] France .................... 77 37892

[51] Int. Cl.³ ................................ B60R 21/10
[52] U.S. Cl. ......................... 280/802; 280/803; 280/804; 297/469
[58] Field of Search ............ 280/802, 803, 804, 808; 297/469, 473, 479, 481, 483, 485

[56] References Cited

U.S. PATENT DOCUMENTS

| 3,583,726 | 6/1971 | Lindblad | 280/804 |
| 3,854,749 | 12/1974 | Fieni | 297/469 |
| 3,976,305 | 8/1976 | Fieni | 280/802 |
| 4,084,841 | 4/1978 | Hayashi et al. | 280/802 |

FOREIGN PATENT DOCUMENTS 2710754  9/1977  Fed. Rep. of Germany .......... 297/481

Primary Examiner—John J. Love
Attorney, Agent, or Firm—Burns, Doane, Swecker & Mathis

[57] ABSTRACT

The device comprises a belt portion passing round a support member carried by an arm which is pivotally mounted on a support located on the side of the seat opposed to the adjacent door of the vehicle. The arm is movable to a roughly vertical clearing position when the door is open. The arm is connected by a cable to a lever which is pivotally mounted on a lateral part of the body of the vehicle and is operatively connected to the door.

11 Claims, 4 Drawing Figures

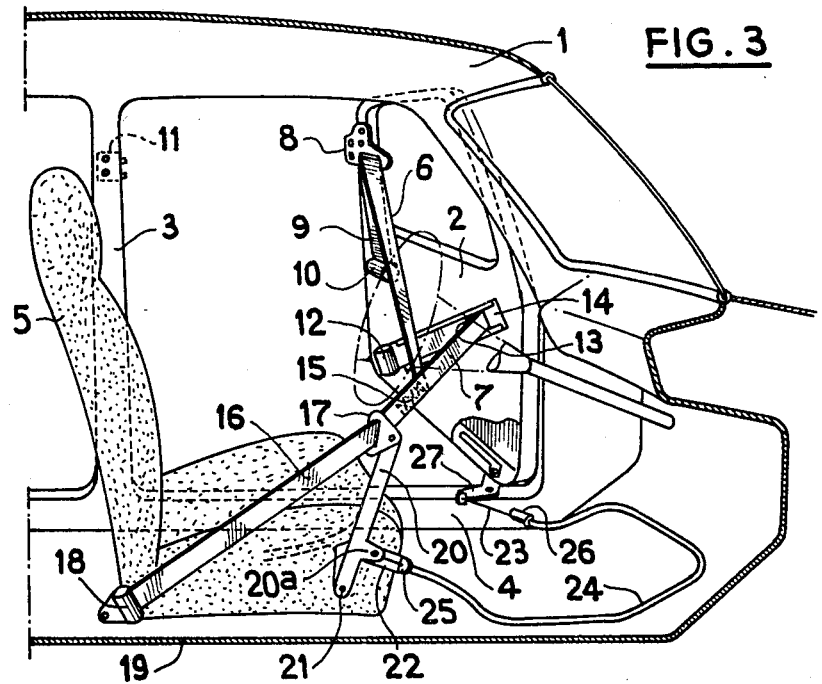
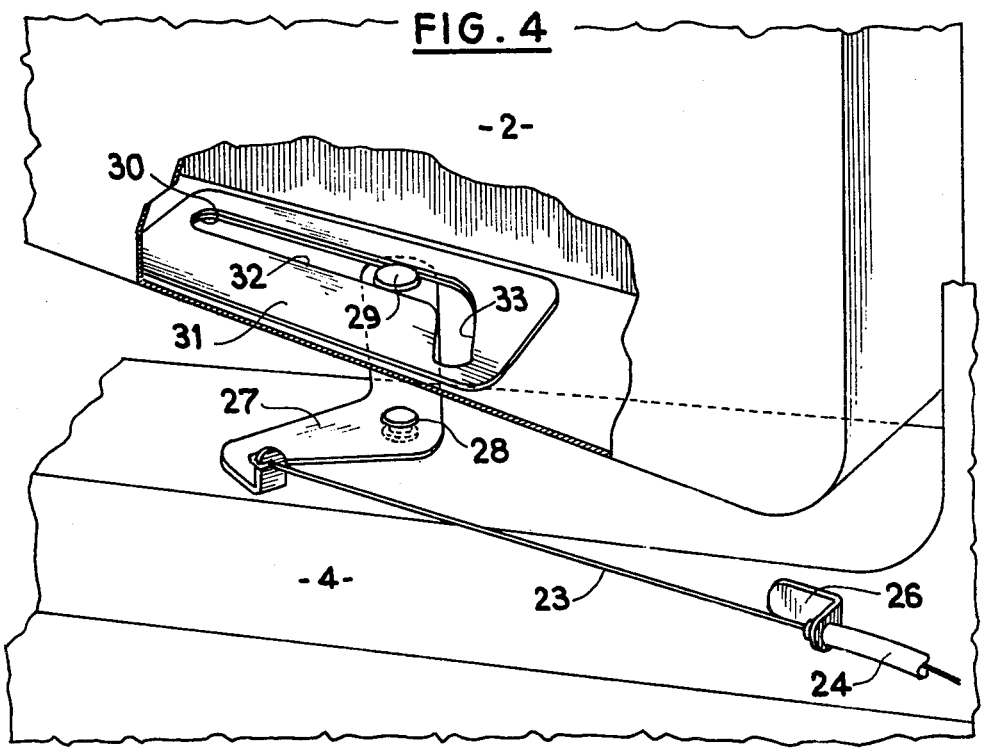

PASSIVE SAFETY BELT FOR AN AUTOMOBILE VEHICLE

DESCRIPTION

The present invention relates to safety devices having belts or straps for retaining the occupants of an automobile vehicle, in the case of accident, and more particularly concerns so-called passive devices, that is to say devices arranged in such manner that they are automatically put into their operative position with no special intervention being required on the part of the users.

Many arrangements have been proposed for rendering safety belts passive. In the simplest arrangements, the movement of the door adjacent the considered seat is employed for moving the belt away and clearing the space around the seat and thereby allowing the user to have access to the seat or leave the seat. Unfortunately, these arrangements do not permit moving away the part of the belt located near the centre of the vehicle away, so that this limits the clearing of the space around the seat. When this situation is desired to be improved, actuating means driven by motors or jacks must be employed which is complicated and costly.

In another arrangement (French Pat. No. 72 08034), a belt passes around a support means carried by an arm pivotally mounted on a support and placed on the side of the seat opposed to the adjacent door, this arm being brought to a roughly vertical clearing position by means of an electric motor which is started up when the door is opened. Such an electric actuation is however costly and relatively complicated.

An object of the present invention is to provide a device of the last-mentioned type which permits achieving a good clearing of the space around the seat by the moving away of the part of the belt located on the opposite side of the seat to the door, which employs particularly simple means related to the movement of the door.

According to the invention, there is provided a device comprising a belt which passes round a belt holding means carried by an arm which is pivotally mounted on a support and placed on the side of the seat opposed to the adjacent door, said arm being capable of being brought to a roughly vertical clearing position upon the opening of the door, wherein said arm is connected by a cable to a lever which is pivotally mounted on a side part of the body of the vehicle and is connected to the door.

According to other features of the invention:

the lever is connected to the door by a lug and slot mechanism, the walls of the slot constituting a cam;

preferably, the shape of the slot is such that the movement of the lever, and consequently that of the arm, is maximum in the initial part of the door-opening movement;

the slot has an L-shape and comprises a first branch which extends in the longitudinal direction of the door and a second branch which is roughly concentric with the pivot axis of the door.

The ensuing description is of one embodiment of the invention with reference to the accompanying drawings, in which:

FIGS. 1 to 3 shows the various positions taken up by the device in accordance with the degree of opening of the neighbouring door;

FIG. 4 is a detail perspective view to an enlarged scale of the part of the device connected to the door.

Figure 1:
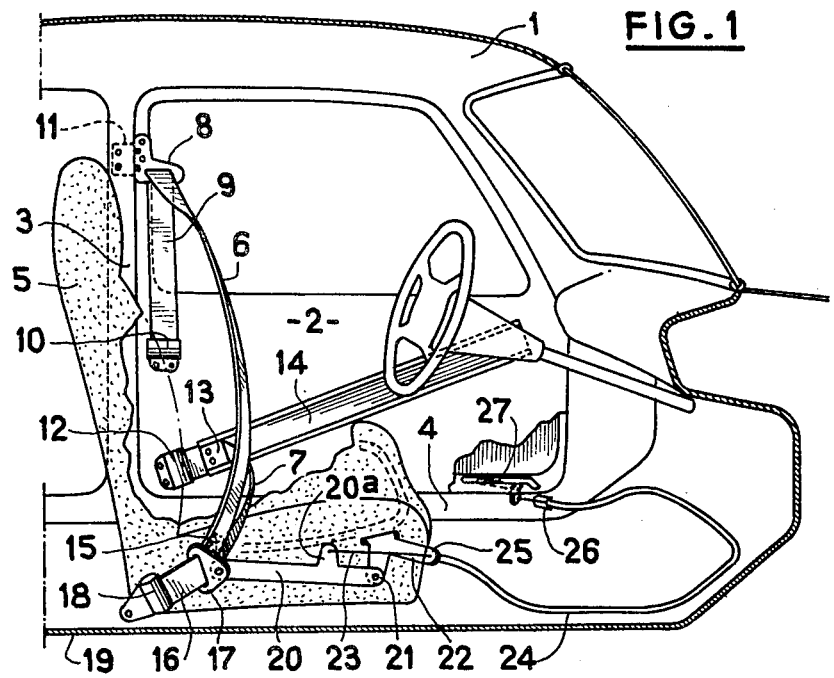
Figure 2:
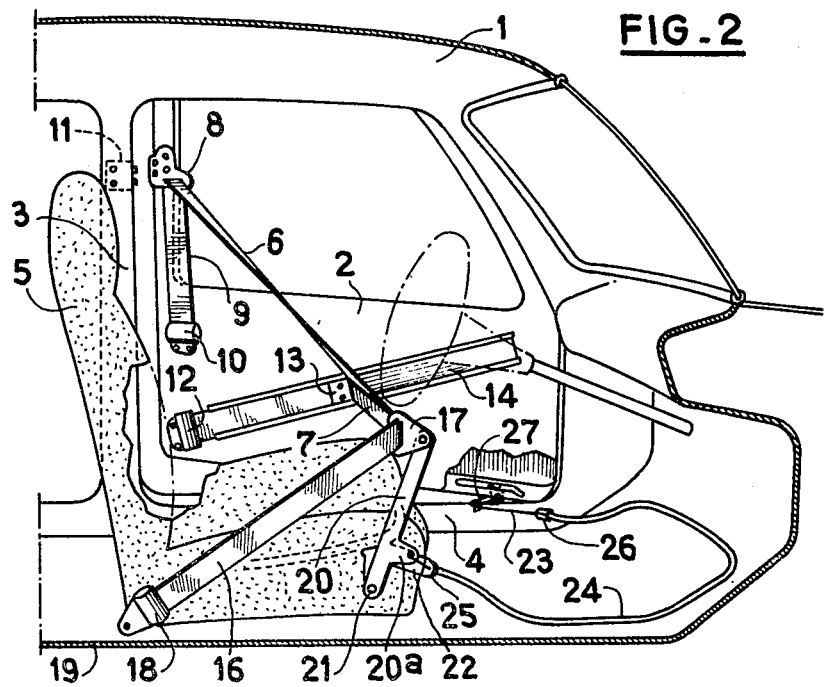

FIGS. 1 to 3 show partly an automobile vehicle body 1 with a door 2, a rear post 3 and a lower side member 4. The door 2 gives access to a seat 5.

A retaining device for maintaining an occupant (not shown) on his seat 5, comprises a shoulder or cross-belt portion 6 and an abdominal belt portion 7.

The upper end of the cross-belt portion 6 passes round a support 8 and is extended downwardly by a vertical portion 9 which terminates in a winder 10. The support 8 is fixed to the rear edge of the door 2 and is associated, in the known manner, with an anchoring member 11 which is fixed to the post 3. The belt winder 10 is secured in the vicinity of the rear edge of the door panel 2.

The abdominal belt portion 7 terminates in a belt winder 12 which is fixed in the rear lower corner of the door 2. This belt portion 7 is secured to a slide 13 which is guided in a slideway 14 which is arranged diagonally on the inner side of the door panel 2. The cross-belt portion 6 and the abdominal belt portion 7 are interconnected by stitching 15 and extended by a belt portion 16 which passes round a belt holding member 17 and terminates in a belt winder 18 fixed to the floor 19 of the vehicle or to the inner side of the seat 5.

The winders 10, 12, 18 are, in the known manner, of the type having a permanent return action on the belt by the effect of a spring and an automatic blocking in the case of a shock or violent braking of the vehicle.

The belt holding member 17 is pivotally mounted on the end of an arm 20 which is movable about a pivot pin 21 in a plane which is substantially vertical and parallel to the longitudinal axis of the vehicle. The pin 21 is carried by a support 22 fixed to the inner side of the seat 5.

Hooked to a lateral extension portion 20a of the arm 20 is a cable 23 which slides in a sheath 24 which is held between a stop 25 formed on the support 22 and a stop 26 fixed to the side member 4 adjacent to the pivot axis of the door 2.

The other end of the cable 23 is hooked to one end of a cranked lever 27 which is pivotally mounted on a vertical pin 28 carried by the side member 4 (FIG. 4). This lever 27 is provided at its other end with a lug or pin 29 which is engaged in a slot 30 which forms a cam and is provided in a plate 31 fixed under the door panel 2. The slot 30 has an L-shape and comprises a first portion 32 which is substantially longitudinal (when the door is closed) and a second portion 33 which is substantially concentric with the pivot axis of the door 2. Bearing in mind its short length, the branch 33 of the slot 30 may be however roughly rectilinear. The above described assembly is a transmission connecting the arm 20 with the door 2.

In normal use, the device just described operates in the following manner:

When the door 2 is closed (FIG. 1), the arm 20 occupies a position in the neighbourhood of the horizontal position and the slide 13 is located in the vicinity of the winder 12 adjacent the rear end of the slideway 14. The safety belt then behaves in the manner of a safety belt having three anchoring points and provides good protection to the occupant of the seat.

When the door 2 is opened, the cam slot 30, in plate 31 acts on the lever 27 which pivots and pulls on the cable 21 and drives the arm 20 upwardly. Owing to the shape of the slot 30, a small opening of the door 2 is sufficient to bring the arm 20 to a substantially vertical position (FIG. 2).

This movement pulls the belt 16 out of the winder 18 but the length of this belt 16 is limited and the winder 18 is rapidly at the end of its unwinding travel and the opening of the door 2 causes the slide 13 to rise along the slideway 14.

When the door has passed beyond a certain angle of opening which is relatively small, the lug 29 of the lever 27 is in the portion 33 of the slot 30 so that a further opening of the door is practically without effect on the position of the lever 27 and therefore of the arm 20.

FIG. 3 shows the position of the belt when the door 2 is completely open.

It can be seen that the space around the seat is well cleared, even in the region of the centre part of the vehicle, this result being obtained by particularly simple means. Moreover, it is important to note that this clearing of the space around the seat near the central part of the vehicle is achieved even if the available space allows only a small opening of the door.

The closing of the door results in a reverse movement of the various parts and brings the device back to the position shown in FIG. 1.

Having now described my invention what I claim as new and desire to secure by Letters Patent is:

1. A safety device in combination with a seat and a vehicle body having a pivotal door for retaining an occupant of the vehicle on the seat, the device comprising a belt, a support rigid with the vehicle body, an arm, a pivotal connection connecting the arm to the support,
    the pivotal connection being located on a side of the seat opposed to the door of the vehicle and adjacent a front end of the seat, a belt holding member carried by the arm adjacent a free end of the arm and carrying a portion of said belt, a transmission connecting the arm to the door and comprising a lever pivotally mounted on a lateral part of the vehicle body adjacent the door, means operatively connecting the lever to the door to pivot the lever as the door is opened, and a cable connecting the arm to the lever, the arm being pivotal between an upper position
    in which a line through the pivotal connection and the belt holding member is substantially vertical and a lower position in which the belt holding member is lowermost for retaining the occupant of the seat, the lower position corresponding to the closed position of the door, the transmission being arranged to ensure that the angular velocity of displacement of the arm for a given velocity of the pivotal movement of the door is higher in a first half of its movement than in a last half of its movement from said lower position to said upper position.

2. A device as claimed in claim 1, wherein means defining a lug and slot mechanism connects the lever to the door, the slot having walls forming a cam.

3. A device as claimed in claim 2, wherein the shape of the slot is such that the movement of the lever, and consequently that of the arm, is complete in an initial part of a door-opening movement.

4. A device as claimed in claim 2, wherein the slot has an L-shape and comprises a first branch which extends longitudinally of the door and a second branch which is roughly concentric with an axis about which the door pivots when opening the door.

5. A device as claimed in any one of the claims 2 or 3, comprising a plate defining the slot and fixed under a panel of the door.

6. A device as claimed in any one of the claims 1 to 4, wherein the lever is cranked and pivotally mounted in an intermediate region of the lever on a vertical pin and is respectively connected to the cable and the door by two end portions of the lever.

7. A device as claimed in claim 1, wherein said line through the pivotal connection and the belt holding member is substantially horizontal in said lower position and the arm has a lateral extension portion, the cable being hooked to the lateral extension portion.

8. A device as claimed in any one of the claims 1 to 4, wherein the belt holding member is pivoted to the arm, said support being fixed to the seat of the vehicle.

9. A device as claimed in any one of the claims 1 to 4, wherein the belt comprises a cross-belt portion and an abdominal belt portion which are interconnected by stitching, a third belt portion of given length extending the cross-belt portion and the abdominal belt portion and passing round the belt holding member and connected to a belt winder which is fixed relative to an inner side of the seat.

10. A safety device in combination with a seat and a vehicle body having a pivotal door for retaining an occupant of the vehicle on the seat, the device comprising a belt, a support rigid with the vehicle body, an arm, a pivotal connection connecting the arm to the support, the pivotal connection being located on a side of the seat opposed to the door of the vehicle and adjacent a front end of the seat, a belt holding member carried by the arm adjacent a free end of the arm and carrying a portion of said belt, a transmission connecting the arm to the door and comprising a lever pivotally mounted on a lateral part of the vehicle body adjacent the door, means operatively connecting the lever to the door to pivot the lever as the door is opened, and a cable connecting the arm to the lever, the arm being pivotal between an upper position in which a line through the pivotal connection and the belt holding member is substantially vertical and a lower position in which the belt holding member is lowermost for retaining the occupant of the seat, the lower position corresponding to the closed position of the door, the cable being connected to the arm and guided relative to the vehicle body to have a line of action on the arm whose perpendicular distance to said pivotal connection is substantially minimum in said lower position of the arm and increases as the arm moves to said upper position and the cable being connected to the lever and guided relative to the vehicle body to have a line of action relative to the lever whose perpendicular distance to the pivotal mounting of the lever on the vehicle body is substantially maximum in the closed position of the door and decreases as the door is progressively opened.

11. A device as claimed in claim 10, wherein said lever is mounted on the vehicle body to pivot about a substantially vertical axis and is substantially parallel to the general plane of the door in a first position corresponding to the closed position of the door and is substantially perpendicular to said first position in a second position of the lever corresponding to said upper position of the arm, said means operatively connecting the lever to the door comprising means defining a slot rigid with the door and a pin rigid with the lever and adjacent to a free end of the lever and slidably engaged in the slot.

* * * * *